(12) United States Patent
Bathiche et al.

(10) Patent No.: US 8,436,789 B2
(45) Date of Patent: May 7, 2013

(54) SURFACE PUCK

(75) Inventors: Steven N. Bathiche, Kirkland, WA (US); Hrvoje Benko, Seattle, WA (US); Stephen E. Hodges, Cambridge (GB); Shahram Izadi, Cambridge (GB); David Alexander Butler, Cambridge (GB); William Ben Kunz, Seattle, WA (US); Shawn R. LeProwse, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

(21) Appl. No.: 12/355,617

(22) Filed: Jan. 16, 2009

(65) Prior Publication Data

US 2010/0182220 A1     Jul. 22, 2010

(51) Int. Cl.
*G09G 5/00*  (2006.01)

(52) U.S. Cl.
USPC .................... 345/7; 345/8; 345/55

(58) Field of Classification Search ............... 345/7–8, 345/55
See application file for complete search history.

(56) References Cited

U.S. PATENT DOCUMENTS

| | | | |
|---|---|---|---|
| 4,877,404 A * | 10/1989 | Warren et al. ............ | 434/118 |
| 5,635,947 A | 6/1997 | Iwamoto | |
| 5,703,637 A * | 12/1997 | Miyazaki et al. .......... | 348/53 |
| 6,118,414 A | 9/2000 | Kintz | |
| 7,068,274 B2 | 6/2006 | Welch et al. | |
| 7,136,090 B1 | 11/2006 | White | |
| 2004/0130614 A1 * | 7/2004 | Valliath et al. ........... | 348/14.01 |
| 2004/0218036 A1 | 11/2004 | Boss et al. | |
| 2007/0201863 A1 | 8/2007 | Wilson et al. | |
| 2009/0122275 A1 * | 5/2009 | Nagashima et al. ........ | 353/85 |
| 2009/0174848 A1 * | 7/2009 | Lin et al. .................. | 349/96 |
| 2010/0007582 A1 * | 1/2010 | Zalewski ................... | 345/8 |

OTHER PUBLICATIONS

Nakanishi, et al. Vision-Based Face Tracking System for Large Displays http://www.vogue.is.uec.ac.jp/~koike/papers/wall/eWallUbicomp2002.pdf. Last accessed Sep. 1, 2008, 8 pages.

Lee, et al. Moveable Interactive Projected Displays Using Projector Based Tracking. UIST '05, Oct. 23-27, 2005, Seattle, Washington, USA. ACM 1-59593-023-X/05/0010 http://www.cs.cmu.edu/~johnny/academic/p104-lee.pdf. Last accessed Sep. 1, 2008, 10 pages.

Raskar, et al. Shader Lamps Animating Real Objects with Image-Based Illumination. UNC-Chapel Hill Technical Report TR00-027, Apr. 2000. http://citeseerx.ist.psu.edu/viewdoc/download?doi=10.1.1.21.4439&rep=rep1&type=pdf. Last accessed Sep. 1, 2008, 10 pages.

Kitamura, et al. The illusionhole with polarization filters. In Proceedings of the ACM Symposium on Virtual Reality Software and Technology (Limassol, Cyprus, Nov. 1-3, 2006). VRST '06. ACM, New York, NY, 244-251.

* cited by examiner

*Primary Examiner* — William Boddie
*Assistant Examiner* — Leonid Shapiro
(74) *Attorney, Agent, or Firm* — Lee & Hayes, PLLC

(57) ABSTRACT

An image orientation system is provided wherein images (rays of lights) are projected to a user based on the user's field of view or viewing angle. As the rays of light are projected, streams of air can be produced that bend or focus the rays of light toward the user's field of view. The streams of air can be cold air, hot air, or combinations thereof. Further, an image receiver can be utilized to receive the produced image/rays of light directly in line with the user's field of view. The image receiver can be a wearable device, such as a head mounted display.

20 Claims, 9 Drawing Sheets

SURFACE PUCK

BACKGROUND

Computing devices are utilized by virtually everyone and in many different types of contexts (e.g., personal, social, professional, and so on). For example, it is common to see people communicating (e.g., telephone calls, text messages, emails, data transfer, and so forth) no matter where that person might be located (e.g., in a supermarket, in a library, taking public transportation, and so forth). As technology advances, so does the speed of communications and the demand for increased computing power. Further, data can be transferred across the country or across the globe in a matter of seconds. Based on the increased demands for computing capabilities, people are requiring more and more resources to be available for communicating electronically, whether the communication is with friends, family, coworkers, or others.

Computing technology has evolved such that touch screens and other devices (e.g., cameras) can track a user's movements and make intelligent decisions regarding those movements. It has also become more commonplace for users to share a single computing environment and work together and/or separately within that computing environment. Since the demand for electronic computing devices is at an all time high, it is important to provide users with any time, anywhere computing capabilities.

A large amount of light (e.g. image) projected from a display is wasted since only a small portion of the light is received by a recipient (e.g., the eye only detects a small fraction of the light). The light that does not reach the recipient's eye is wasted, which represents a waste of both energy and light. There are two types of images, which are a real image and a virtual image. The real image is something that is actually present and can be experienced. The virtual image is an optically generated (or projected) image that appears in the back of the recipient's eye.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with one or more central devices, sometimes referred to as a "puck" or "surface puck", which are placed in a common area (such as the middle of a table). The central devices are configured to perceive the faces, and more importantly the eyes, of the people in the room or within a local geographic area (e.g., room). The central device can perform face-tracking orientation such that as eye movements are detected, the user experience can be dynamically adjusted. Each person can walk around the central device and the light projected from the device moves with the person, whose location is monitored.

After detecting the eyes, light is sent directly to the eyes (or the user's face) in order to create a panoramic display or other type of display (e.g., spherical surface, two-dimensional surface, and so forth). Each eye can receive a different image and stereoscopic imagery can be provided at substantially the same time to multiple participants. In an aspect, the light can be refracted though utilization of one or more streams of air.

In another aspect, the light can be directed toward a wearable display associated with a user. The wearable display collects the light and projects the light to the user's eyes. As the virtual image arrives at the recipient's eye(s), any space around the recipient can become an interactive surface. In such a manner, anything (e.g. the whole world) can become an interactive surface.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Figure 1:
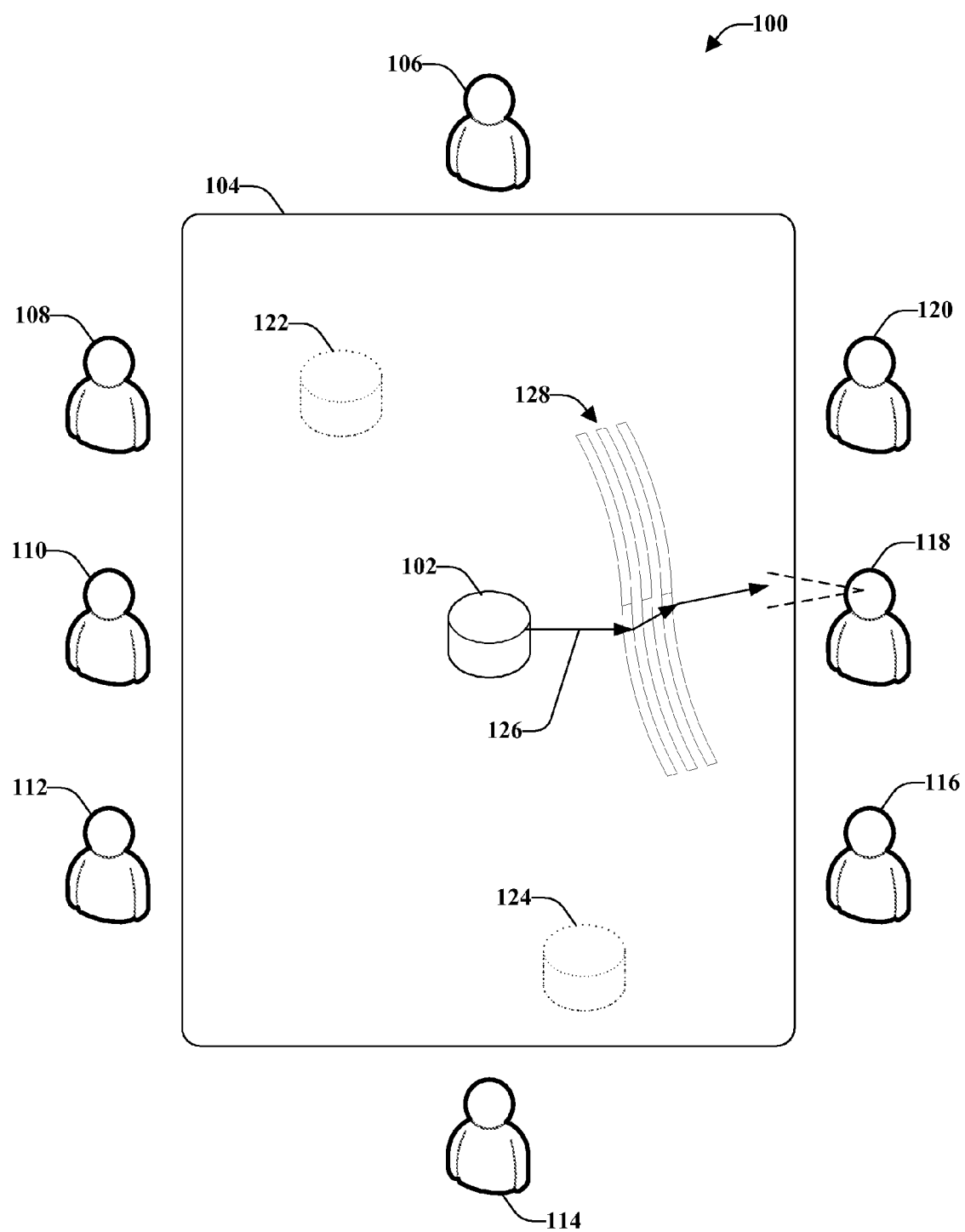
FIG. 1 illustrates an example environment that utilizes a surface puck to dynamically adjust a user experience as a function of user tracking and interaction, according to an aspect.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Artificial intelligence based systems (e.g. explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Referring initially to FIG. 1, illustrated is an example environment 100 that utilizes a surface puck to dynamically adjust a user experience as a function of user tracking and interaction, according to an aspect. The disclosed aspects are configured to dynamically track a user's face and/or eyes and adjust an angle of light rays or an angle of an image in order to more closely align the angle of light rays (or image) toward the user's face/eye.

The example environment 100 can be a surface computing environment. As the trend moves to using any surface (e.g., table, wall, and so forth) as a display, there can be multiple individuals interacting with the display at substantially the same time. Further, these surface computing environments can allow users to share a single computing environment and work together and/or separately within that computing environment (e.g., classroom setting, business setting, conference, symposium, seminar, personal or family setting, and so forth).

The surface computing environment 100 includes a central device 102, referred to herein as a surface puck, which can be placed in a common area, such as a table 104, which can be a surface table (or a table that functions as both a table and a display), for example. Although the surface puck 102 is illustrated and described as located in the center of a table 104, the surface puck 102 can be placed in any location within the surface computing environment 100.

In accordance with some aspects, the surface puck 102 can be any dimension such as a few inches in diameter. Further, it should be understood that although the surface puck 102 as disclosed herein is illustrated and described as a circular object, other geometric configurations can be utilized.

The central device 102 can be placed in the middle of the room and can be configured to track each user's eyes and send light toward each user's eyes for virtual viewing. In an example, the surface puck 102 can be placed in a living room and as a person walks in the room, the display finds the person (e.g., facial recognition) and immediately transmits light to their eyes. The person can move around the area and the direction the image is projected is dynamically altered to allow the person to continue to perceive the image.

The central device or surface puck 102 is configured to perceive the faces of individuals with the surface computing environment 100. There can be any number of individuals within the surface computing environment 100. Illustrated are eight users, labeled $User_1$ 106, $User_2$ 108, $User_3$ 110, $User_4$ 112, $User_5$ 114, $User_6$ 116, $User_7$ 118, and $User_8$ 120. Although eight users are illustrated, it should be understood that the disclosed aspects can be utilized with any number of users. As illustrated, the users can be positioned around the table 104, however, in accordance with some aspects, the users can be located anywhere within the surface computing environment 100 (e.g., standing in the back of a room, sitting against a wall (not at the table), and so forth). Further, the users 106-120 can change positions (e.g., walk around, pace back and forth, etc.) as they interact with the surface computing environment 100 and with others (e.g., other users 106-120) within the surface computing environment 100. In accordance with some aspects, each eye can receive a different image and, thus, stereoscopic imagery can be provided to multiple users at substantially the same time.

A large percentage of light energy that is emitted does not reach or enter a user's eye. Since it generally is not known where the user's eyes are located, a large amount of light needs to be generated, allowing at least some of the light to reach the user's eye and be perceived by the user. Thus, conventional displays are inefficient because the eye only captures a small portion of the light being emitted. However, if the light can be directed directly to the eye, a smaller amount of light needs to be emitted. The surface puck 102 can be configured to output light that is generated and oriented toward a user such that a large percentage of the light being emitted is received by the user (e.g., received at the user's eye), thus a lower amount of light needs to be generated and transmitted.

In accordance with some aspects, multiple central devices 102 can be utilized, illustrated at 122 and 124. Multiple surface pucks 102, 122, and 124 can be utilized in large areas (e.g., conference room, auditorium, and so forth). Although three surface pucks 102, 122, 124 are illustrated; any number of surface pucks can be utilized in accordance with the disclosed aspects. Further, the surface pucks 102, 122, and 124 can be located in disparate locations. For example, a first surface puck can be on a first table, a second surface puck can be located on a podium, and a third and fourth surface puck can be located on a second table.

Light, or visible light is electromagnetic radiation of a wavelength that is visible to a human eye. There are three properties of light, namely, intensity, frequency or wavelength, and polarization. Light can exhibit properties of both waves and particles, referred to as the wave-particle duality. The speed of light is constant and generally light rays travel in straight lines. However, when light rays pass from (or through) one material to another, the light rays can be forced to bend (e.g., change direction and continue on a new straight path). This bending is referred to as refraction. The higher a material's index of refraction, the slower the light travels through the material and the more the light rays bend or change direction. Air, for example, has a refractive index of around 1.0, water has a refractive index of about 1.3 and glass has a refractive index of about 1.5. Further, light travels faster through hot air than it does through cold air.

The light rays light can be projected from the surface puck 102, illustrated at 126 and, at substantially the same time, a stream of cold air, hot air, or combinations thereof 128 can be projected across the light rays 126 being transmitted by the surface puck 102. The stream of air 128 can cause the rays of light to become focused and slightly bend toward the user's face or eye, as illustrated. In accordance with some aspects, each user can be provided individual images and associated individual streams of air. In such a manner, each individual can receive a different image. In accordance with some aspects, one or more individuals can receive a similar image.

In an aspect, the cold air, hot air, or mixture of hot and cold air, can be projected from one or more devices 122, 124 (or another device) that are separate from the central device 102. These devices can be located in various locations though the room or surface computing environment 100 and can communicate wireless with the central device 102. Based on an indication from the central device 102, one or more of the remote devices can project the air in order for the image to be deflected toward the viewer. In accordance with some aspects, central device 102 can be configured to project the light/image and provide the air movement at substantially the same time.

Figure 2:
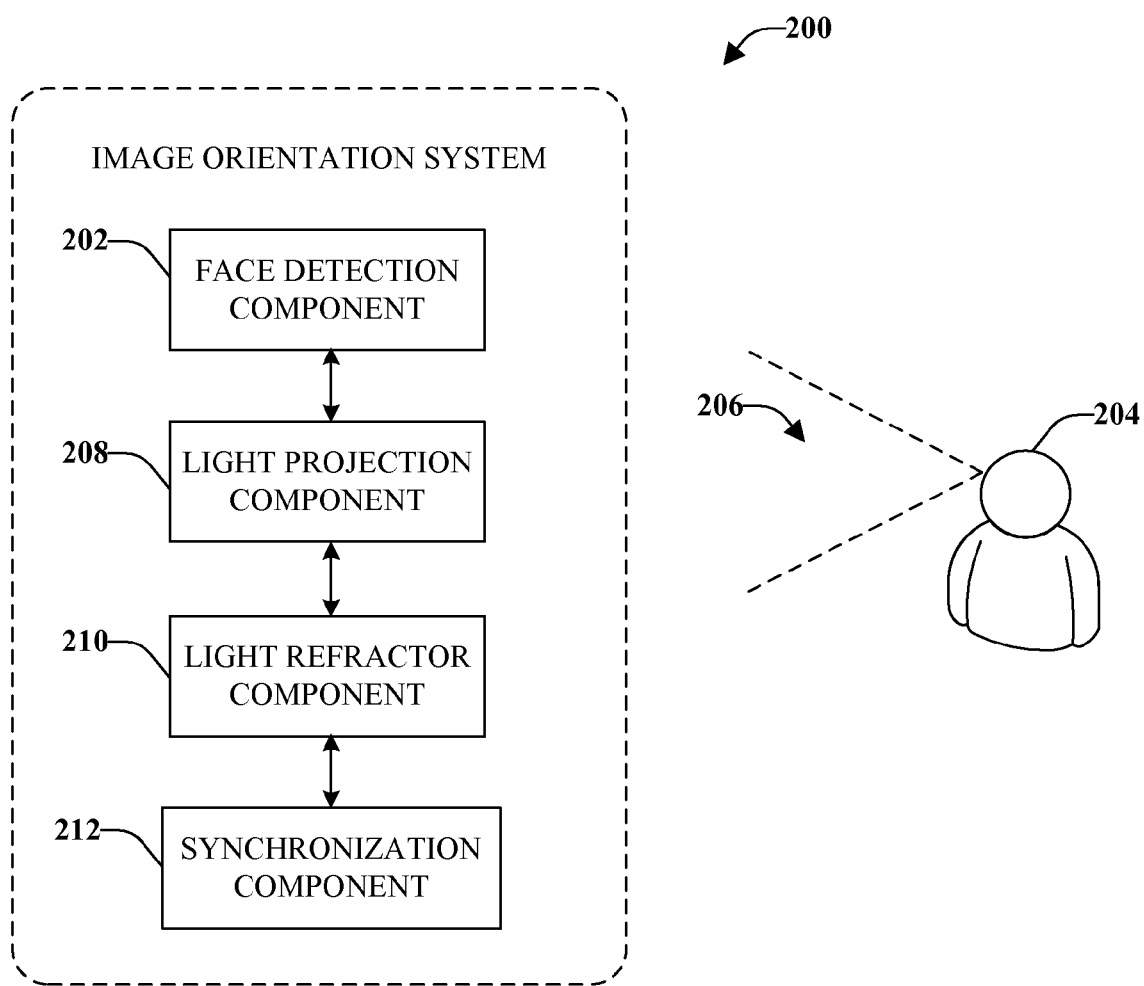
FIG. 2 illustrates an image orientation system for directing light towards a user.

FIG. 2 illustrates an image orientation system 200 for directing light towards a user. System 200 can be configured to slightly alter the direction or angle of light rays (or an image) in order to project (or refract) the image in the direction of a user's eyes to create a virtual image. System 200 can be embodied, for example, within a central device or surface puck (e.g. surface puck 102, 122, 124 of FIG. 1).

System 200 includes a face detection component 202 that is configured to perform face tracking to determine a direction that a user is facing based on the location of the user's eyes. In accordance with some aspects, the face detection component 202 can be configured to detect the location of a user 204 and, specifically the user's face and/or eyes, wherein each eye can be detected individually and a viewing angle 206 can be inferred. For example, face detection component 202 can be configured to periodically, constantly, or based on other intervals, scan the area in which image orientation system 200 is located and make a determination as to the location of each user 204. Based on the location of each user, a determination can be made whether the user is standing or sitting (e.g., based on height). Further, face detection component 202 can observe the user's movements to determine which direction the user is facing (e.g., faced toward the image orientation system 200, facing away from the image orientation system 200, and so forth). In accordance with some aspects, the direction the user is facing can change based on the user's interactions with system 200 and with other users. Face detection component 202 can be configured to dynamically adjust to these changes.

Based on the angle of view 206, a light projection component 208 can be configured to transmit or project light rays (or an image) in the direction detected by face detection component 202, which is the user's angle of view 206. The light rays projected by light projection component 208 might not have a large field of view, but can provide a virtual or projected image to the viewer 204.

If there is more than one user detected by face detection component 202, light projection component 208 can be configured to project one or more light rays (or images) in a multitude of directions. In accordance with some aspects, light projection component 208 can be configured to project rays of light at different heights to mitigate the commingling of the light rays (or images), which can allow each user to receive a separate image.

A light refractor component 210 is configured to refract or bend the light rays while the light is being projected to the one or more users. For example, the light refractor component 210 can be configured to propel a stream of cold air (or supply a stream of cold air) in the direction of the viewer 204. The cold air can have a high refractive index and can operate as a lens in the air (e.g., mid air) that can bend the light and project the light toward the viewer 204 (e.g., in the user's angle of view. The cold air can act as an index lens so that the ray of light from light projection component 208 can fan out and, when the light rays hit the cold air, the light rays are concentrated and fan back in, towards user's viewing angle 206.

The light rays can be bent near the eye, such as one inch away, or at any other location provided the light rays are refracted to coincide with the angle of view 206. In accordance with some aspects, the light rays might be bent very slightly to create an image around the image orientation system 200, which is perceivable by the user 206.

In accordance with some aspects, hot air can be utilized or a combination of hot and cold air can be utilized with the disclosed aspects. According to some aspects, cold air with hot surround can be utilized. In this manner, thermal radiance or other means can be utilized to bend rays of light in mid air so that a virtual image can be formed in the viewers angle of view 206 by creating rays of light that approach the eye at many different angles. The means to bend rays of light in mid air can be utilized for limited periods of time. For example, the stream of air provided by light refractor component 210 can be applied for a limited duration, thereafter, another stream of air can be provided for a limited duration, and so forth.

In accordance with some aspects, there can be multiple central devices included in image orientation system 200 to provide light rays and/or one or more devices that provide the streams of air. Thus, a synchronization component 212 is configured to coordinate the images displayed by the two or more central devices and/or to coordinate the streams of air. For example, if two devices are sending substantially the same image to one or more viewers, the devices can synchronize the transmission of the images so that the image projected by each device is received by the viewer(s) 204 at about the same time. Further, if one device is providing the image and a second device is providing the air stream, synchronization component 212 coordinates the timing of both devices so that the image is refracted at the appropriate time so that the image is bent toward the angle of view 206.

In accordance with some aspects, a first light projection component transmits a first image and a second light projection component transmits a second image towards a user's eyes (as determined by a face detection component). Synchronization component 212 coordinates the timing of the first image and the second image for receipt by the user at a similar time. However, in accordance with some aspects, a single projection component can transmit multiple images. Additionally or alternatively, two separate images can be transmitted to a single user, one image for each eye, creating a three-dimensional image.

Face detection component 202 can be configured to continuously (e.g., periodically, continuously, and so forth) monitor the direction the user is facing (e.g., the user's orientation and viewing angle). If there is a change detected (e.g., the user is facing in a different direction), face detection component 202 conveys the information related to the change to the light projection component 208 and/or the light refractor component 210. Based on this information, the light projection component 208 can modify the orientation of the transmitted image. According to some aspects, light projection component 208 can stop the transmission of the image as a function of the change (e.g., the user is looking at a different surface puck, the user is leaving the room, and so forth). Additionally or alternatively, based on the information from face detection component 202, light refractor component 210 can modify an orientation of the stream of air across the transmitted image or can discontinue the stream of air (e.g., no longer supply the air stream to bend the image).

In accordance with some aspects, synchronization component 212 might instruct the light projection component 208 and the light refractor component 210 to discontinue their associated functions and instruct a second image orientation system (and associated components) to continue the image projection/refraction. The second image orientation system can operate in substantially the same manner as described with reference to image orientation system 200. In accordance with some aspects, the second image orientation system can be included in surface puck 122 or 124 of FIG. 1.

According to various aspects, the light projection component 208 and the light refractor component 210 can be located within a single device. According to other aspects, light projection component 208 and light refractor component 210 are located within separate devices.

Figure 3:
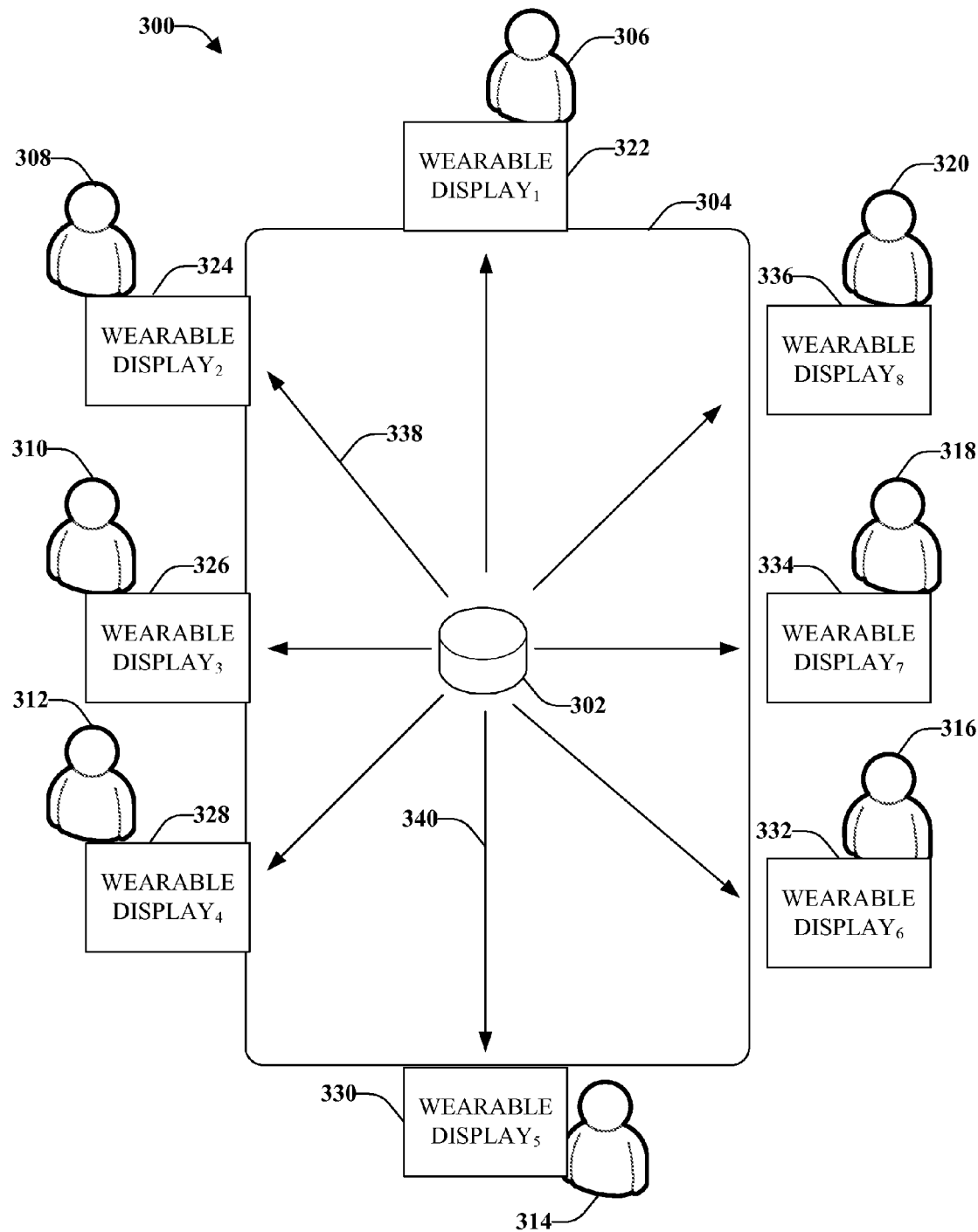
FIG. 3 illustrates an example surface computing environment that utilizes image receivers to augment a personal experience in accordance with one or more aspects.

FIG. 3 illustrates an example surface computing environment 300 that utilizes image receivers to augment a personal experience in accordance with one or more aspects. In this aspect, the user is asked to wear (or be associated with) a device that receives an image from one or more surface pucks and distributes the image for projection into a user's field of view.

System 300 includes a central device 302 that is configured to be placed in a surface computing environment 300. For example, the central device 302 can be placed on a table 304 or other surface within the surface computing environment 300. The central device 302 is configured transmit light and/or images to one or more users, labeled User$_1$ 306, User$_2$ 308, User$_3$ 310, User$_4$ 312, User$_5$ 314, User$_6$ 316, User$_7$ 318, and User$_8$ 320.

Associated with each user 306-320 can be an image receiver, such as wearable display that is configured to augment a personal experience. These wearable displays are labeled wearable display$_1$ 322, wearable display$_2$ 324, wearable display$_3$ 326, wearable display$_4$ 328, wearable display$_5$ 330, wearable display$_6$ 332, wearable display$_7$ 334, and wearable display$_8$ 336. For example, the wearable displays 322-336 can be a pair of glasses that are utilized to augment the surrounding world. In another example, the wearable displays 322-336 can be a visor or other device that can capture an image from central device 302 and project that image in a form for the viewer to perceive the image within the user's field of view. In another example, the wearable display can be a removable display (e.g., opera glasses) that a user activates when the user desires to interact with central device 302 and/or surface computing environment 300.

As illustrated, the central device 302 transmits rays of light, a few of which are labeled at 338 and 340, in the direction of each wearable display 322-336. In accordance with some aspects, different users 306-320 can utilize a different type of wearable display 322-336. For example, one user can utilize a pair of glasses while another user utilizes a visor, and so forth. However, in accordance with some aspects, if each user has a similar wearable device, each user can interact with virtual elements with gestures or laser pointers, and so forth, which will be discussed in further detail below.

Figure 4:
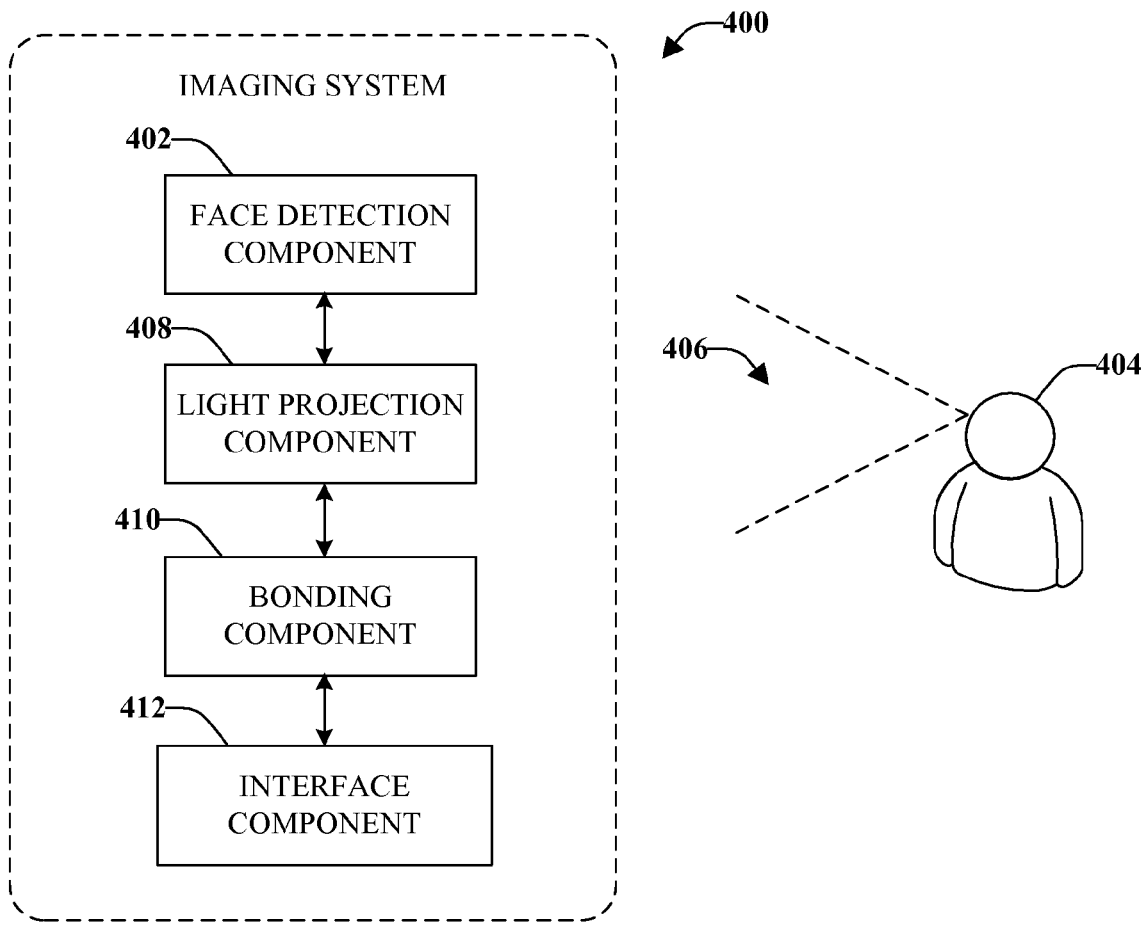
FIG. 4 illustrates an imaging system that augments a personal computing experience in accordance with the disclosed aspects.

FIG. 4 illustrates an imaging system 400 that augments a personal computing experience in accordance with the disclosed aspects. The imaging system 400 is configured to provide users close to an image projecting device with a similar image granularity as an image received by viewers that are located a greater distance away from the device (e.g., users far away from the image projection device receive about the same image as those users that are close to the image projection).

Imaging system 400 utilizes a wearable display that is positioned near or directly onto a viewer's eyes. A central device or puck can be a frame of reference for everyone in the room that is interacting and looking in the direction of the central device. Imaging system 400 includes a face detection component 402 that is configured to detect a user 404, and specifically, a user's field of view 406. The face detection component 402 can be configured to track a wearable device associated with the viewer 404 and a light projection component 408 can be configured to transmit the information directly to the wearable device, which can adjust its view accordingly, allowing the user to walk around the virtual image. The virtual image created by the wearable device can be a wide angle image (e.g., larger than the device transmitting the virtual image).

Also included in system 400 is a bonding component 410 that is configured to detect one or more users 404 and associated head-mounted displays. The bonding component 410 can detect the presence of the one or more users/head-mounted displays based on various indicators, such as presence information where each head-mounted display is configured to send information related to its presence in the environment. Such presence information can be transmitted periodically, when the head-mounted display is activated (e.g. turned on), based on a request from a central device or other surface computing equipment, or based on other criteria.

The bonding component 410 can be configured to establish a one-way or two-way relationship between the surface puck (e.g., imaging system 400) and the wearable device (e.g., user 404). Thus, as soon as a user looks in the direction of the central device, which can be based on the orientation of the wearable display as detected by bonding component 410, an image or rays of light can be transmitted to the wearable device or user 404.

Upon detection of at least one head mounted display, a light or an image can be projected by light projection component 408 in the direction of the head mounted display. Utilizing the head mounted display as a focal point for the light rays (or image) allows the head mounted display to remain lightweight, which provides the user with comfort, each of usage, and greater mobility. In accordance with some aspects, two different images can be projected, one image for each eye, creating a three-dimensional image.

In accordance with some aspects, the head mounted display can be associated with the system 400 and an integral component of system 400. In this aspect, as a user enters the surface computing environment, the head mounted display is provided to the user and the user does not bring their own display into the surface computing environment (e.g. user does not have to carry around their own head mounted display).

The image sent from light projection component 408 can be transmitted wireless to the wearable displays. In this manner, the images are rendered by the light projection component 408 (or surface puck) and the head wearable displays are not rendering the images. In this manner, the wearable devices are simply scanning the image and not performing any computing and/or translating of the image.

In accordance with some aspects, imaging system 400 includes an interface component 412 that is configured to selectively allow a user to interface with the virtual image. Interface component 412 can be configured to receive one or more gestures or other interactions from the user 404. Interface component 412 can be configured to interpret the gesture or other interaction as a function of the information being presented to the user. Based on this input, the user can interact with system 400 to perform various computing functions.

For example, interface component 412 can provide a graphical user interface (GUI), a command line interface, a speech interface, Natural Language text interface, and the like. For example, a GUI can be rendered that provides a user with a region or means to load, import, select, read various information and can include a region to present the results of this interaction. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 5:
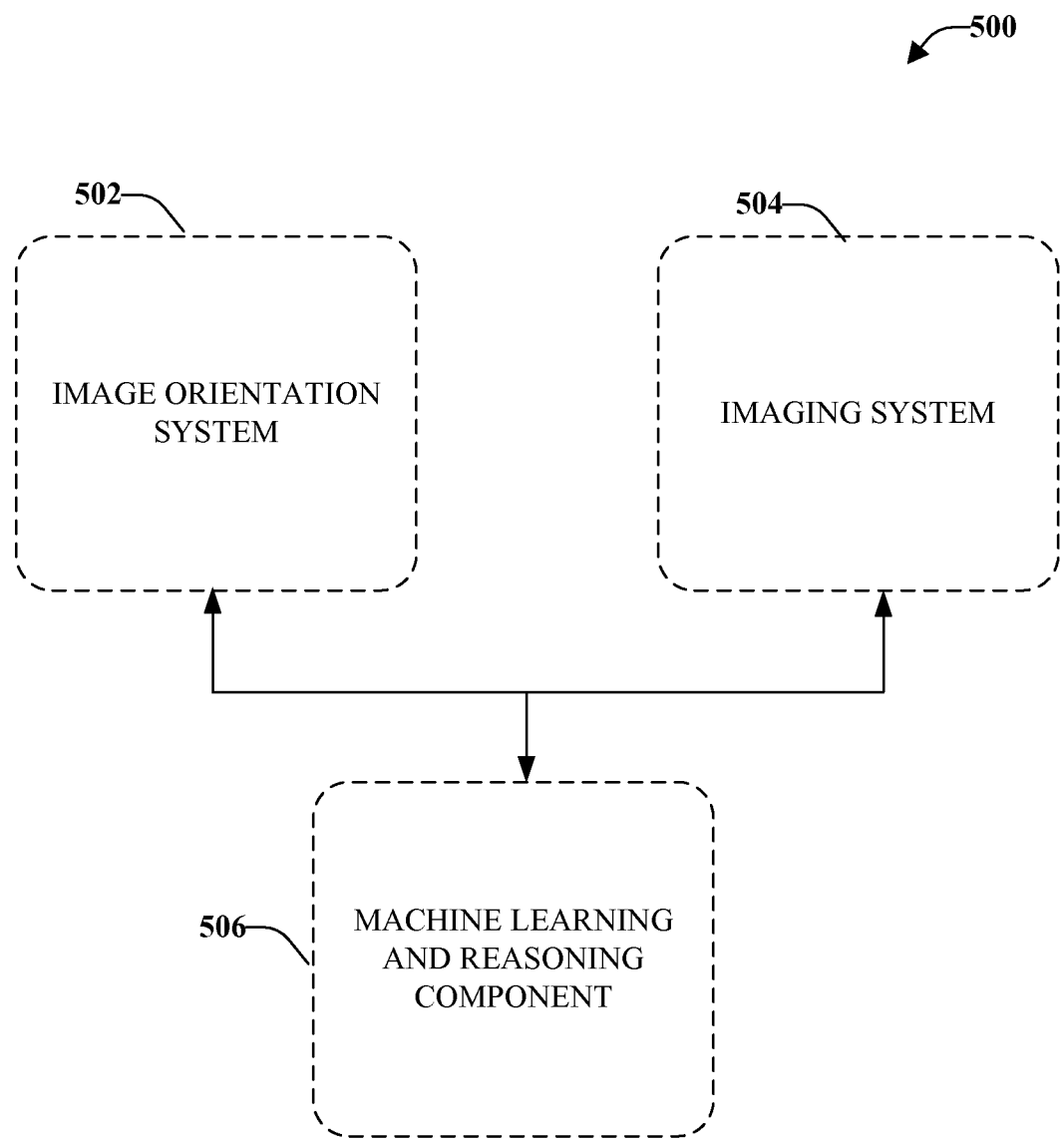
FIG. 5 illustrates a system that employs machine learning and reasoning to automate one or more features in accordance with the disclosed aspects.

FIG. 5 illustrates a system 500 that employs machine learning and reasoning to automate one or more features in accordance with the disclosed aspects. System 500 includes an image orientation system 502 that is configured to direct or refract light toward one or more users. For example, image orientation system 502 can utilize streams of air to refract light toward a user's eyes. Also included in system 500 is an imaging system 504 that is configured to augment a personal computing experience through utilization of a wearable device. In accordance with some aspects, image orientation system 500 and/or imaging system 504 can be utilized separately or at substantially the same time.

System 500 also includes a machine learning component 506 can employ various machine learning techniques to automate one or more features associated with an image orientation system 502 and/or an imaging system 504 in accordance with the disclosed aspects.

The machine learning and reasoning component 506 can employ principles of probabilistic and decision theoretic inference, and rely on predictive models constructed through the use of machine learning procedures. Logic-centric inference can also be employed separately or in conjunction with probabilistic methods. The machine learning and reasoning component 506 can infer a direction in which an image and/or light should be projected by obtaining knowledge about the orientation of the user (e.g., direction a user is facing) and knowledge about what is being displayed to the user based on the application, the application context, the user context, or combinations thereof. Based on this knowledge, the machine learning and reasoning component 506 can make an inference based on how users interact with system 500, with each other, or combinations thereof. Based on these orientations, the machine learning and reasoning component 506 can infer the direction in which light should be directed and/or deflected based on the orientation of the one or more users. In another example, machine learning and reasoning component 506 can operate with a wearable display to determine an orientation of a user and the direction of focus of the user.

The various aspects (e.g., in connection with determining a user focus or a user orientation, and so forth) can employ various artificial intelligence-based schemes for carrying out various aspects thereof. For example, a process for determining if a user is focused on an image or on another person and/or object within the computing environment can be enabled through an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of user orientation and a direction in which an image/light should be directed, for example, attributes can be facial recognition, eye gaze recognition, and the classes are applications or functions being utilized in the surface computing environment.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g. by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria in which direction to project an image light, which image to project to each user, what users to group together (e.g., provide a similar image), relationships between users, and so forth. The criteria can include, but is not limited to, similar images, historical information, and so forth.

Additionally or alternatively, an implementation scheme (e.g. rule) can be applied to control and/or regulate image projection, inclusion of a group of users to view a similar image, privileges, and so forth. It will be appreciated that the rules-based implementation can automatically and/or dynamically interpret a direction of focus based upon a predefined criterion. In response thereto, the rule-based implementation can automatically interpret and carry out functions associated with providing an image in the direction of focus by employing a predefined and/or programmed rule(s) based upon any desired criteria.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
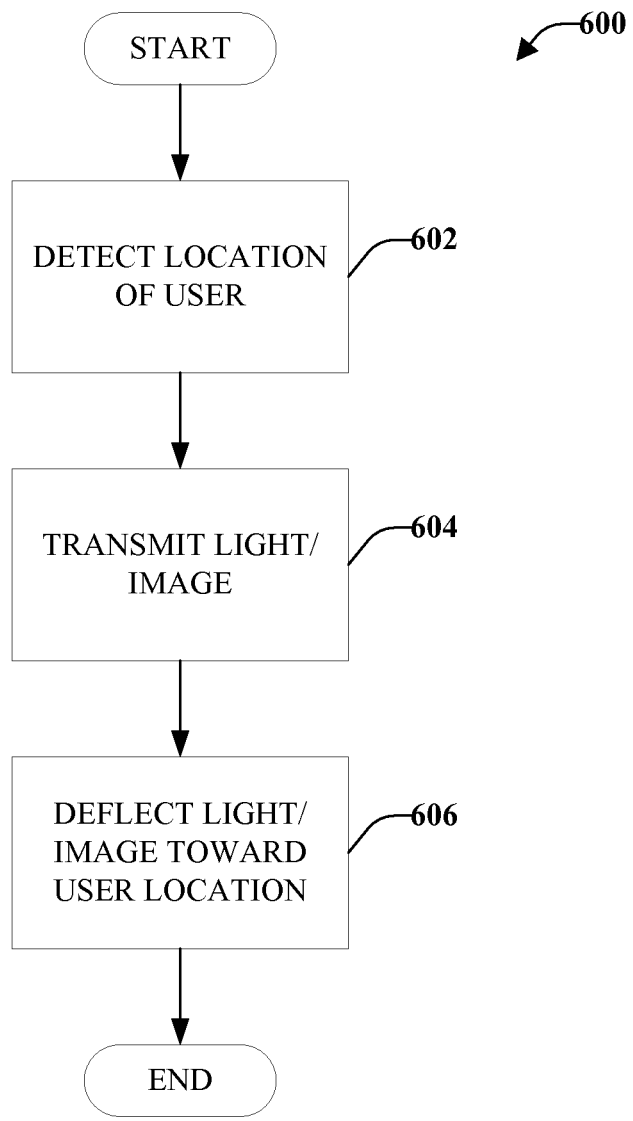
FIG. 6 illustrates a method for determining a user location and modifying a direction of one or more light rays or images toward the user location.

FIG. 6 illustrates a method 600 for determining a user location and modifying a direction of one or more light rays or images toward the user location. As the user changes position (e.g., moves around the room) the direction in which the light rays are projected can change. As the user changes her direction of focus (e.g. looks away from a central device), the image might no longer be sent to the user until the user is once again focused on the central device (and looking for the image). In accordance with some aspects, based on the change in the orientation of the user, the image is projected by a device different than the device that previously projected the image.

Method 600 starts, at 602, when the location of a user is detected. The location of the user can be detected based on various means, such as face recognition/detection, eye location recognition/detection, the orientation of the user (e.g., the direction in which the user is facing), and so forth. In accordance with some aspects, the location of the user can be detected based on one or more objects associated with the user. For example, the location of the user can be made based on detection of a mobile device (e.g., cell phone, laptop, and so forth) associated with the user. For example, the device can transmit its location and based on this information, the location of the user can be inferred. Based on this inference, further processing can include determination of a direction in which the user is facing.

At 604, an image (or light rays) are projected, such as from a central device. The image (or light rays) can be projected in the general direction of the user. In accordance with some aspects, the image can be projected at variable heights depending on whether the user is standing or sitting.

Based on the orientation of the user and a position of the user's eyes, the image/light rays are deflected toward the user, at 606. The deflection can include sending a stream of air (e.g., cold air, hot air, a mixture of cold and hot air) in a direction across the image in order to slightly change the direction of the image (e.g., bend the image) in order to more closely align the image to the user's eyes. When the image or light rays pass through the stream of air, the light rays can be deflected slightly toward the user, allowing the light to become more focused at the user's eyes or within a user's field of view.

Figure 7:
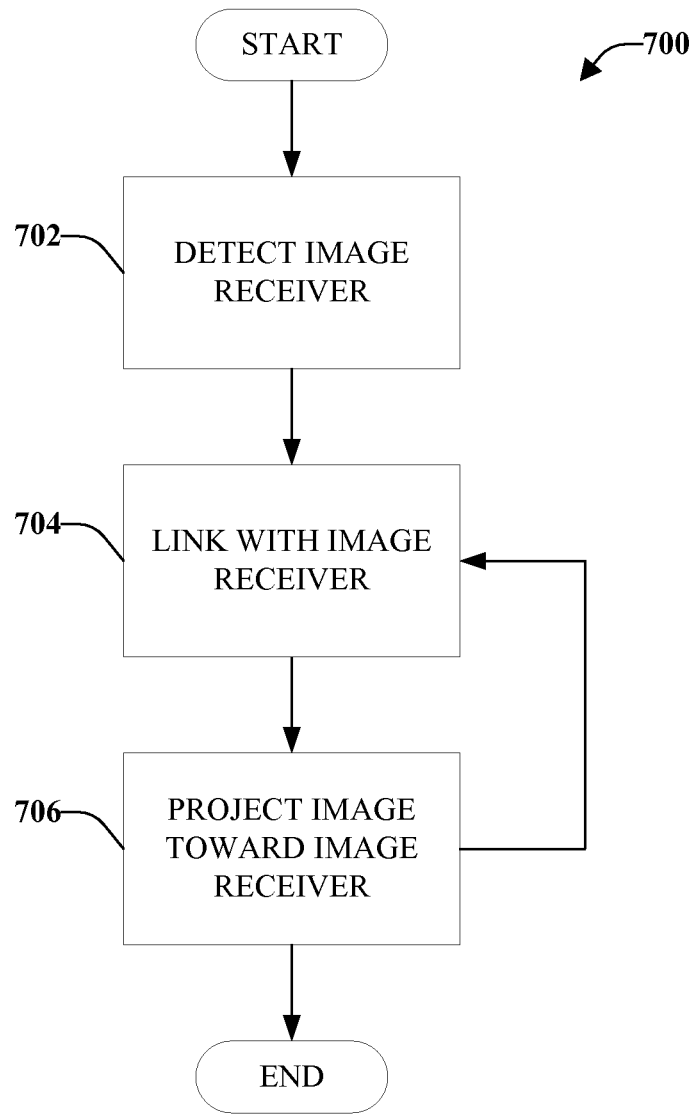
FIG. 7 illustrates a method for utilizing image receiving devices in order to allow a user to view a virtual image.

FIG. 7 illustrates a method 700 for utilizing an image receiving device in order to allow a user to view a virtual or projected image. Method 700 begins, at 702, with detection of an image receiver, which can be a wearable device as disclosed herein. The image receiver is associated with a user within a surface computing environment. Detection of the image receiver can be made based on detection of a user, registration of a user with a surface computing environment (e.g. authenticating with the surface computing environment, and so forth).

At 704, a linkage with the image receiver is performed or detected. This linkage can create a bond between the image producing device and the image receiver. For example, the bond can be formed when the image receiver is oriented in a position such that the user is looking (or faced) in the direction of the image producing device. If the image receiver is not bonded or linked with the image producing device, an image is not transmitted to the user, which can conserve energy.

If there is a linkage or bonding (e.g., user is looking in the direction of the image producing device), at 706, an image is projected toward the image receiver. The image can be specific to the individual (e.g., based on authentication information) or it can be an image intended for multiple users (e.g., a presentation during a conference).

A feedback loop can be provided such that if the bond or linkage with the image receiver is lost (e.g., user turns away from the image producing device), the image is no longer sent to the user until the bond is once again formed or restored, which can conserve energy since the image is no longer generated and sent (at least temporarily).

Figure 8:
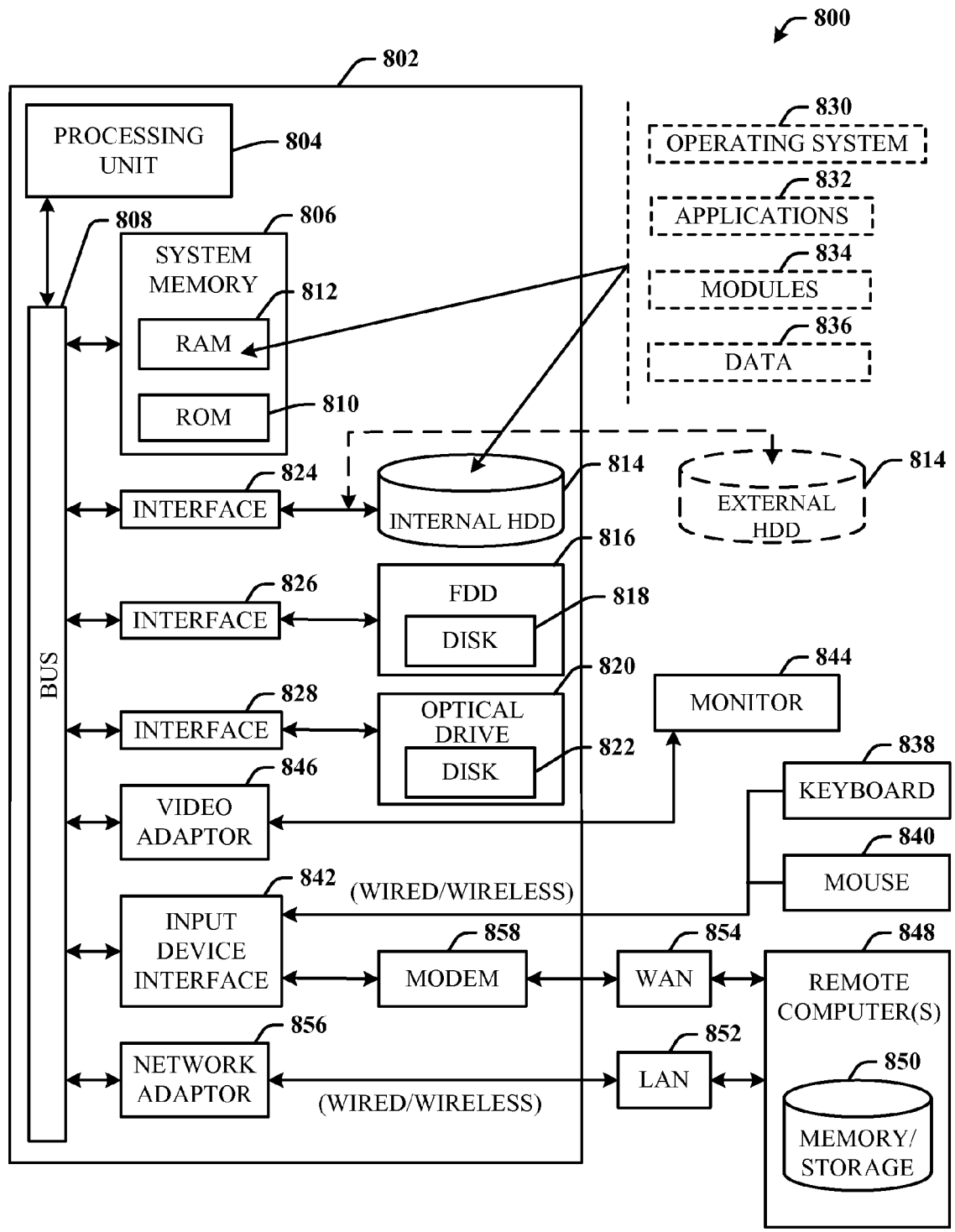
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects disclosed herein, FIG. 8 and the following discussion are intended to provide a brief, general description of a suitable computing environment 800 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g. EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the various aspects can be implemented with various commercially available operating systems or combinations of operating systems.

A user can enter commands and information into the computer 802 through one or more wired/wireless input devices, e.g. a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 may operate in a networked environment using logical connections through wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated.

The logical connections depicted include wired/wireless connectivity to a local area network (LAN) 852 and/or larger networks, e.g. a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
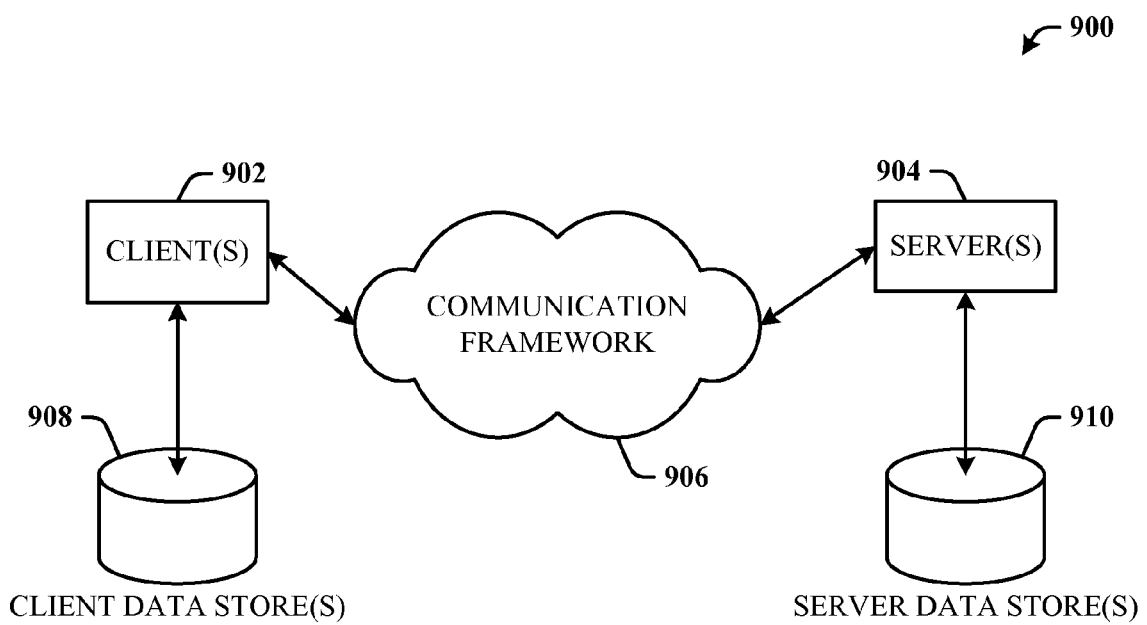
FIG. 9 illustrates a schematic block diagram of an exemplary computing environment in accordance with the various aspects.

Referring now to FIG. 9, there is illustrated a schematic block diagram of an exemplary computing environment 900 in accordance with the various aspects. The system 900 includes one or more client(s) 902. The client(s) 902 can be hardware and/or software (e.g. threads, processes, computing devices). The client(s) 902 can house cookie(s) and/or associated contextual information by employing the various aspects, for example.

The system 900 also includes one or more server(s) 904. The server(s) 904 can also be hardware and/or software (e.g. threads, processes, computing devices). The servers 904 can house threads to perform transformations by employing the various aspects, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system that facilitates projection of a light directly towards a user's eye to create an image, comprising:
    a face detection component that performs face tracking to determine a direction that a user is facing;
    a light projection component that transmits a first image in the detected direction; and
    a light refractor component that supplies a first stream of air across a path of the transmitted first image to bend the path of the transmitted first image toward a user's viewing angle; a property of the first stream of air determined based at least in part on the user's viewing angle.

2. The system of claim 1, the face detection component continues to monitor the direction the user is facing and dynamically conveys a change in the direction to the light projection component that modifies an orientation of the first image or stops the transmission of the first image as a function of the change.

3. The system of claim 1, the face detection component continues to monitor the direction the user is facing and dynamically conveys a change in the direction to the light refractor component that modifies an orientation of the stream of air across the path of the first image or discontinues the steam of air as a function of the change.

4. The system of claim 1, further comprising
    at least a second light projection component that transmits a second image in the detected direction; and
    a synchronization component that coordinates timing of the first image and the second image for receipt by the user at a similar time.

5. The system of claim 1, further comprising
    at least a second light refractor component that supplies a second stream of air across the path of the transmitted first image; and
    a synchronization component that coordinates timing of the first stream of air and the second stream of air to bend the path of rays of light associated with the first image toward the user's viewing angle.

6. The system of claim 1, further comprising a synchronization component that instructs the light projection component and the light refractor component to discontinue their associated functions if the face detection component detects a change in the direction the user is facing.

7. The system of claim 6, further comprising a second light projection component, the synchronization component instructs the second light projection component to transmit the first image in the changed direction.

8. The system of claim 6, further comprising:
    a second light refractor component, the synchronization component instructs the second light refractor component to supply a second stream of air across a path of the transmitted first image to bend the path of the transmitted first image toward the changed direction.

9. The system of claim 1, the stream of air is cold air, hot air, or combinations thereof.

10. The system of claim 1, the light projection component and the light refractor component are included within a single device.

11. The system of claim 1, the light projection component and the light refractor component are included within separate devices.

12. The system of claim 1, further comprising a machine learning and reasoning component that automates one or more components of the system.

13. One or more computer-readable storage devices storing computer-executable instructions that, when executed, perform a method comprising:
    performing face tracking to detect a direction that a user is facing;
    transmitting a first image in the detected direction; and
    supplying a first stream of air across a path of the transmitted first image to bend the path of the transmitted image toward a viewing angle of the user; a property of the first stream of air determined based at least in part on the viewing angle of the user.

14. The one or more computer-readable storage devices of claim 13, the method further comprising:
    continuing to monitor the direction the user is facing; and
    dynamically modifying an orientation of the first image or stopping the transmission of the first image as a function of a change in the monitored direction.

15. The one or more computer-readable storage devices of claim 13, the method further comprising:
    continuing to monitor the direction the user is facing; and
    dynamically modifying an orientation of the first image or discontinuing the stream of air as a function of a change in the monitored direction.

16. The one or more computer-readable storage devices of claim 13, wherein the stream of air is cold air, hot air, or combinations thereof.

17. A method that facilitates viewing of a virtual image comprising:
    performing face tracking to detect a direction that a user is facing;
    transmitting a first image in the detected direction; and
    supplying a first stream of air across a path of the transmitted first image to bend the path of the transmitted image toward a viewing angle of the user; a property of the first stream of air determined based at least in part on the viewing angle of the user.

18. The method of claim 17, further comprising:
    transmitting a second image in the detected direction; and
    coordinating a timing of the first image and the second image for receipt by the user at a similar time.

19. The method of claim 17, further comprising:
    supplying a second stream of air across the transmitted first image; and
    coordinating a timing of the first stream of air and the second stream of air to bend a path of rays of light associated with the first image toward the user's viewing angle.

20. The method of claim 17, wherein the stream of air is cold air, hot air, or combinations thereof.

* * * * *